United States Patent
Sugawara

(10) Patent No.: US 11,632,475 B2
(45) Date of Patent: Apr. 18, 2023

(54) IMAGE SCANNING APPARATUS, METHOD FOR CONTROLLING IMAGE SCANNING APPARATUS, AND STORAGE MEDIUM

(71) Applicant: CANON KABUSHIKI KAISHA, Tokyo (JP)

(72) Inventor: Naoki Sugawara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/724,246

(22) Filed: Apr. 19, 2022

(65) Prior Publication Data

US 2022/0345573 A1 Oct. 27, 2022

(30) Foreign Application Priority Data

Apr. 26, 2021 (JP) .............................. JP2021-074087

(51) Int. Cl.
*H04N 1/00* (2006.01)
*H04N 1/10* (2006.01)
*H04N 1/32* (2006.01)
*H04N 1/053* (2006.01)

(52) U.S. Cl.
CPC ..... *H04N 1/00076* (2013.01); *H04N 1/00037* (2013.01); *H04N 1/00053* (2013.01); *H04N 1/00063* (2013.01); *H04N 1/00241* (2013.01); *H04N 1/053* (2013.01); *H04N 1/1043* (2013.01); *H04N 1/3263* (2013.01); *H04N 2201/0049* (2013.01); *H04N 2201/0072* (2013.01); *H04N 2201/04734* (2013.01); *H04N 2201/329* (2013.01)

(58) Field of Classification Search
CPC ........... H04N 1/00076; H04N 1/00037; H04N 1/00063; H04N 1/00241; H04N 1/3263
See application file for complete search history.

(56) References Cited

U.S. PATENT DOCUMENTS

| | | | |
|---|---|---|---|
| 6,809,836 B1 | 10/2004 | Nobuta et al. ................. 358/1.9 |
| 7,852,516 B2 | 12/2010 | Sugawara ..................... 358/400 |
| 8,498,023 B2* | 7/2013 | Suzuki ..................... H04N 1/40 |
| | | | 358/404 |
| 2002/0054341 A1* | 5/2002 | Suzuki ............... H04N 1/00912 |
| | | | 358/1.15 |
| 2012/0019878 A1* | 1/2012 | Motoyama ......... H04N 1/00615 |
| | | | 358/474 |

(Continued)

FOREIGN PATENT DOCUMENTS

JP 2008-124648 5/2008

*Primary Examiner* — Benjamin O Dulaney
(74) *Attorney, Agent, or Firm* — Venable LLP

(57) ABSTRACT

Provided is a technique for allowing a user to easily check the status of an image scanning apparatus. An image scanning apparatus is configured to transmit original document image data by storing, sequentially in a buffer, line data obtained by line-by-line scanning of an original document and transmitting the stored line data to a host computer sequentially line by line, and includes a control unit configured to perform control to transmit original document image data including notification image data to the host computer in a case where it is detected that the apparatus status of the image scanning apparatus is not normal during processing executed in response to a scan command received from the host computer, the notification image data being a notification of an error occurrence.

15 Claims, 12 Drawing Sheets

(56) References Cited

U.S. PATENT DOCUMENTS

2018/0359375 A1* 12/2018 Seo .................... H04N 1/00212
2019/0222707 A1* 7/2019 Nojiri ................ H04N 1/00917
2020/0374407 A1* 11/2020 Kobayashi ......... H04N 1/00236

* cited by examiner

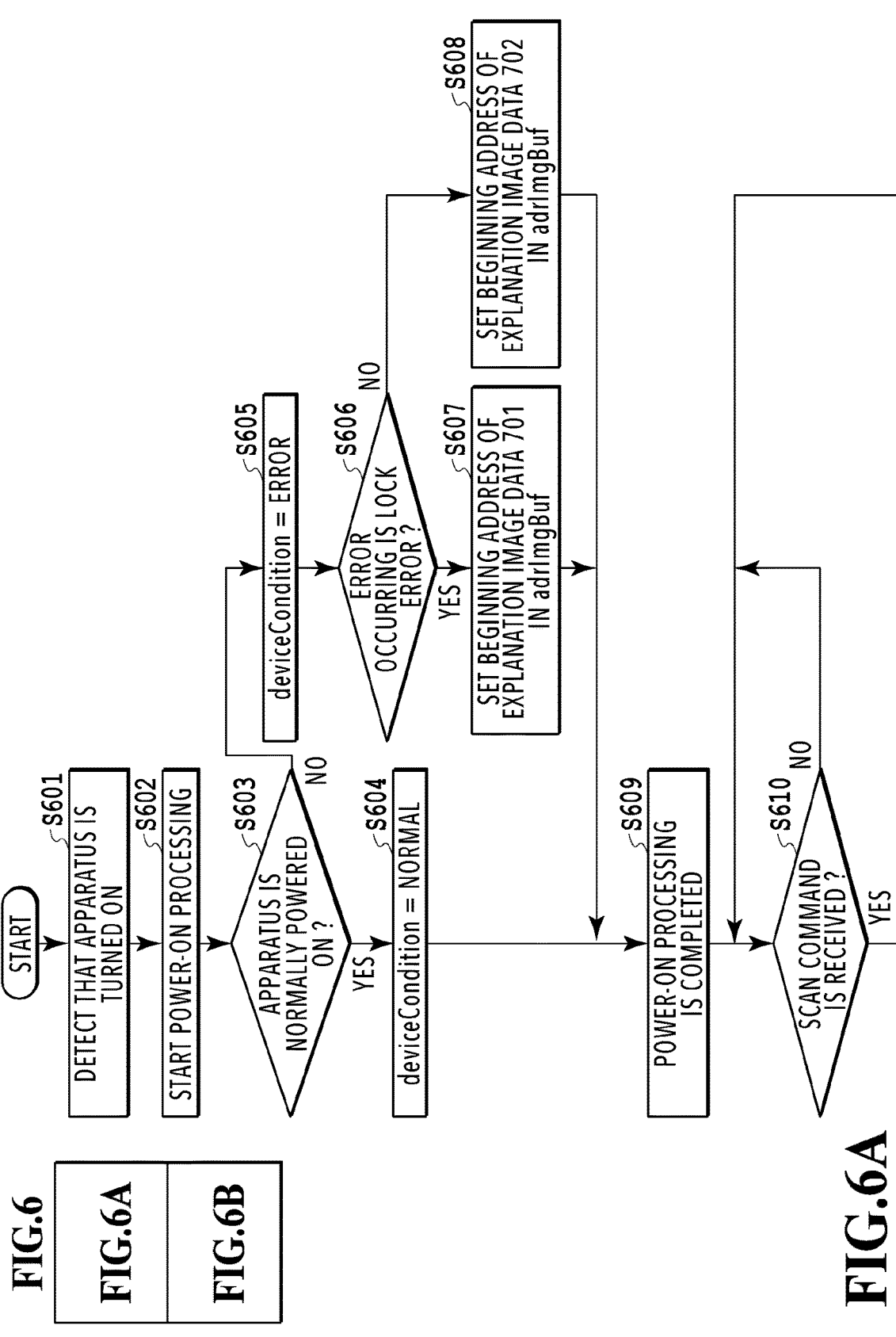

IMAGE SCANNING APPARATUS, METHOD FOR CONTROLLING IMAGE SCANNING APPARATUS, AND STORAGE MEDIUM

BACKGROUND

Field

The present disclosure relates to a technique pertaining to an image scanning apparatus.

Description of the Related Art

Japanese Patent Laid-Open No. 2008-124648 discloses a technique that allows a user to check an error in an image scanning apparatus by scanning a two-dimensional code displayed on the display of the image scanning apparatus with their mobile phone.

In recent years, there have been demands for improvement in the operability of image scan processing.

The technique of the present disclosure has an object to provide a technique that allows a user to easily check the status of an image scanning apparatus.

SUMMARY

An image scanning apparatus according to the present disclosure is configured to transmit original document image data by storing, sequentially in a buffer, line data obtained by line-by-line scanning of an original document and transmitting the stored line data to a host computer sequentially line by line, and includes a control unit configured to perform control to transmit original document image data including notification image data to the host computer in a case where it is detected that an apparatus status of the image scanning apparatus is not normal during processing executed in response to a scan command received from the host computer, the notification image data being a notification of an error occurrence.

Further features of the present disclosure will become apparent from the following description of exemplary embodiments with reference to the attached drawings.

BRIEF DESCRIPTION OF THE DRAWINGS

FIG. 6 is a diagram showing the relationship of FIGS. 6A and 6B;

FIGS. 6A and 6B are diagrams showing an example flowchart illustrating scan processing;

DESCRIPTION OF THE EMBODIMENTS

Embodiments of the technique of the present disclosure are described below using the drawings. Note that the embodiments given below are not intended to limit the present disclosure, and not all the combinations of features described in the embodiments are necessarily essential for the solution means of the present disclosure.

Embodiment 1

<Image Scanning Apparatus>

Figure 1A:
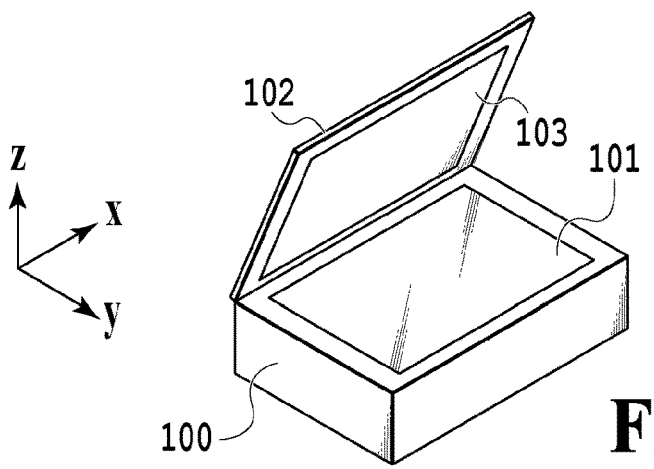
FIGS. 1A to 1C are diagrams schematically showing an example of an image scanning apparatus.
Figure 1B:
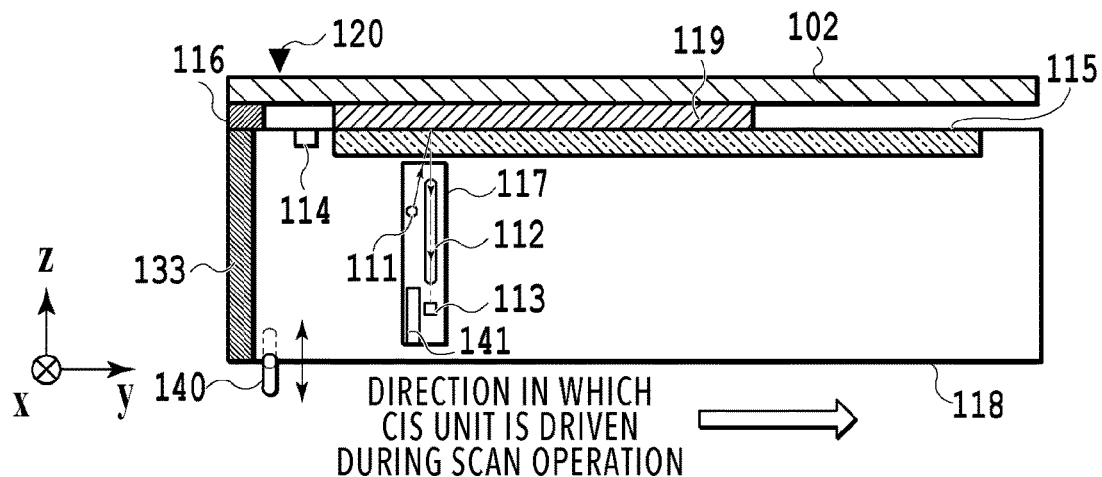
Figure 1C:
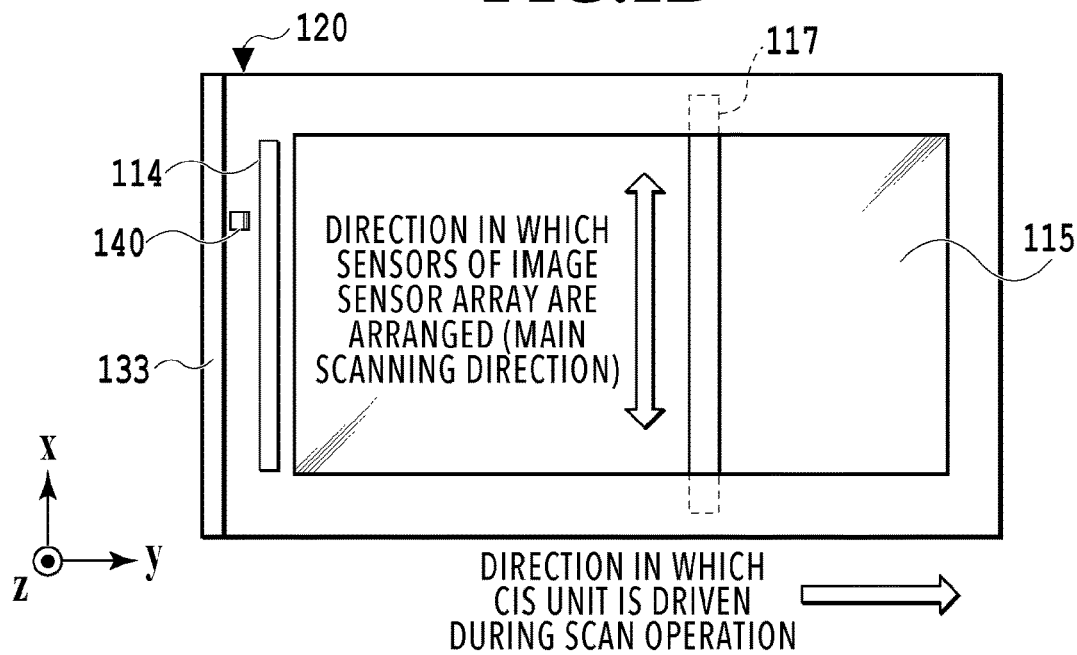

Embodiment 1 according to the technique of the present disclosure is described below with reference to the drawings. FIGS. 1A to 1C are diagrams schematically showing an example of an image scanning apparatus according to the present embodiment. FIG. 1A is a perspective external view of an image scanning apparatus 100. FIG. 1B is a sectional side view of the image scanning apparatus 100. FIG. 1C is a sectional top view of the image scanning apparatus 100.

First, the external appearance of the image scanning apparatus 100 is described. The image scanning apparatus 100 includes an original document platform 101 and an original document platform cover 102. Then, an original document 119 to be scanned can be set on the original document platform 101. The original document platform cover 102 is a pressure plate that can press and fix the original document 119 against the original document platform 101, and can mitigate the influence of outside light. The original document platform cover 102 is linked to a reference sidewall 133 via a hinge 116, provided in an openable and closable manner.

Next, the internals of the image scanning apparatus 100 are described. The original document platform cover 102 has a white sheet 103 attached thereto so that a part other than an original document may be formed as a white image. The original document platform 101 is provided with a contact glass 115. To scan an original document 119 using the image scanning apparatus 100, the original document platform cover 102 is closed to sandwich the original document 119 between the original document platform cover 102 and the contact glass 115. Then, a contact image sensor (hereinafter referred to as CIS) unit 117 scans the original document 119 while moving. The scanning of the original document 119 produces a scanned image of the original document 119. Since the original document 119 is pressed against the contact glass 115 by the original document platform cover 102, a constant distance can be maintained between the CIS unit 117 and the original document 119.

The CIS unit 117 includes a light emitting diode (LED) light guide unit 111 that produces light and illuminates the original document 119 and an image sensor array 113 that generates an electric signal by photoelectric conversion. The light produced by the LED light guide unit 111 strikes and is reflected by the original document 119 and is guided to the image sensor array 113 by a rod lens array 112. The image sensor array 113 is configured such that sensors capable of performing photoelectric conversion on incident light and outputting current are arranged one-dimensionally in the main scanning direction which is a ±x direction. The image scanning apparatus 100 receives outputs from the sensors forming the image sensor array 113 in the order in which they are arranged and performs A/D conversion.

The CIS unit 117 includes a lock receiver opening 141 for inserting a lock member 140. In a case where the CIS unit 117 is at home position 120, a user can insert the lock member 140 into the lock receiver opening 141, the lock member 140 being provided at a frame 118 of the image scanning apparatus 100. As a result, the CIS unit 117 is fixed at the position of the home position 120, restricted from moving. The home position 120 is the reference position of the CIS unit 117 and is a position where the CIS unit 117 stops and stands by during operation standby. A reference position mark 114 and the reference sidewall 133 of the frame are used as a reference for the image scanning apparatus 100 to recognize the y-direction position of the original document 119 placed on the original document platform 101. Since the image scanning apparatus 100 shown in FIG. 1C is in the middle of scanning the original document 119, the CIS unit 117 is at a position other than the home position 120. In FIGS. 1B and 1C, the CIS unit 117 is shown at different positions from each other.

<Hardware Configuration of the Image Scanning Apparatus>

Figure 2:
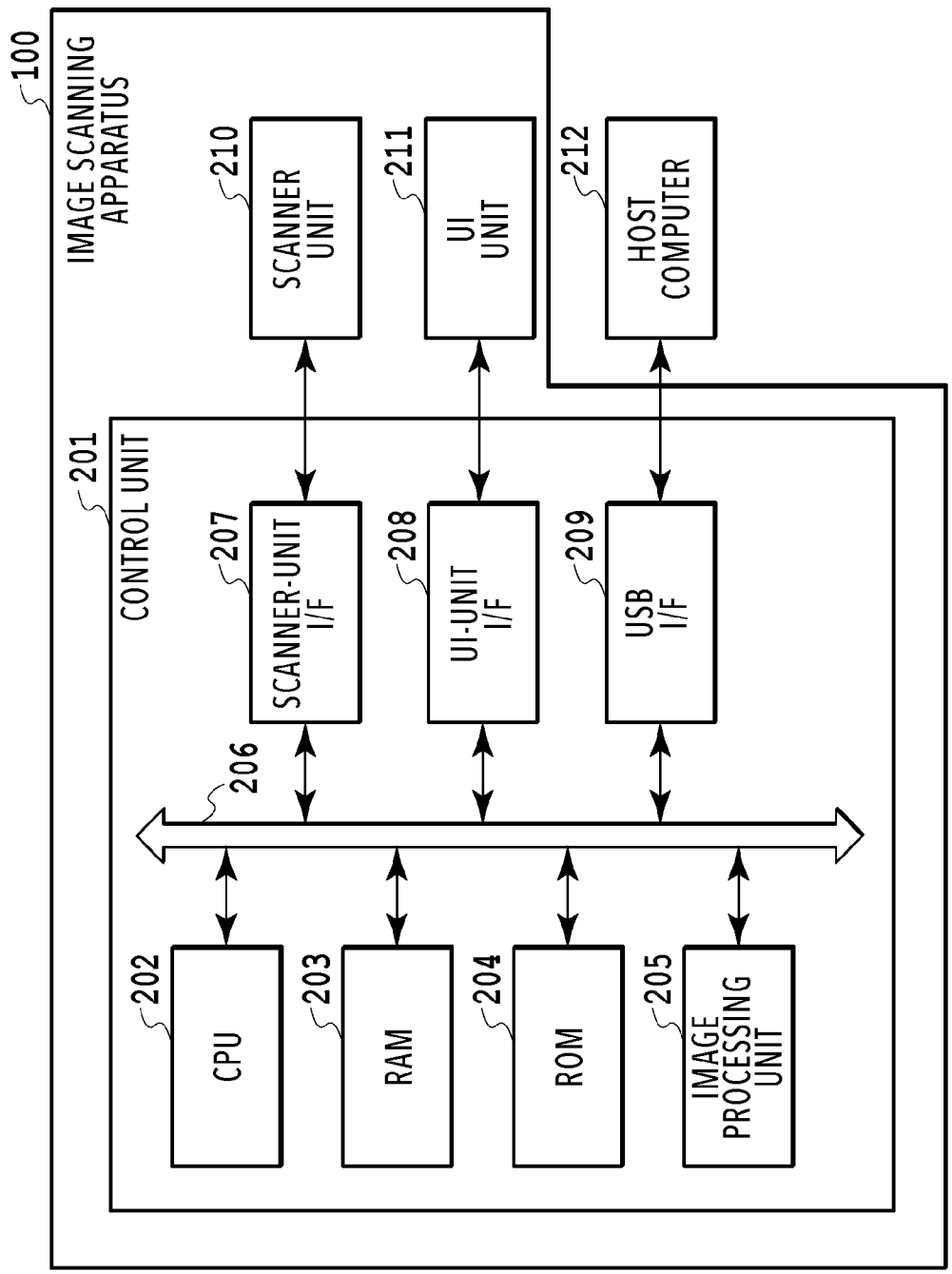
FIG. 2 is a block diagram showing the hardware configuration of the image scanning apparatus.

FIG. 2 is a block diagram showing the hardware configuration of the image scanning apparatus 100. The image scanning apparatus 100 includes a control unit 201, a scanner unit 210, and a user interface (UI) unit 211. The control unit 201 includes a CPU 202, a RAM 203, a ROM 204, an image processing unit 205, a bus 206, a scanner-unit I/F 207, a UI-unit I/F 208, and a USB I/F 209.

The control unit 201 controls overall operation of the image scanning apparatus 100 by mediating information among the units via the bus 206. The CPU 202 stores, in the RAM 203, digital image data on the original document 119 scanned by the scanner unit 210. Also, the CPU 202 loads a control program stored in the ROM 204 into the RAM 203 and reads the control program as needed to perform various kinds of control. After confirming that the digital image data has been transferred to a host computer 212, the CPU 202 deletes the digital image data stored in the RAM 203. Once transfer and deletion is completed for all the digital image data, a scan operation requested by the host computer 212 ends. The RAM 203 is a main storage memory of the CPU 202 and is used as a work area or a temporary storage area into which to load various programs stored in the ROM 204. Also, digital image data scanned by the scanner unit 210 is stored in the RAM 203. The ROM 204 stores therein predetermined image data, various programs, and various pieces of setting information. Although a flash storage or the like is assumed as the ROM 204 in the present embodiment, the ROM 204 may be an auxiliary storage device such as a hard disk. Note that explanation image data (FIGS. 7A and 7B) and notification image data (FIGS. 9A and 11A) to be described later are, for example, stored in the ROM 204 before reception of a user operation. In the image scanning apparatus 100, one CPU 202 uses one memory (the RAM 203) to execute each process shown in the flowchart to be described later, but a different mode may be employed instead. For example, a plurality of CPUs, RAMs, ROMs, and storages may cooperate with one another to execute each process shown in the flowchart to be described later. Also, a hardware circuit may be used to execute part of the processing.

The image processing unit 205 is used in a case of performing image processing or correction on digital image data obtained by a scan operation. The image processing unit 205 is mainly used to use a hardware function to perform processing such as image processing or correction which would take time if such processing were performed by a control program loaded into the RAM 203. The scanner-unit I/F 207 is an interface that connects the scanner unit 210 to the control unit 201. The UI-unit I/F 208 is an interface that connects the UI unit 211 to the control unit 201. The USB I/F 209 is an interface that connects the image scanning apparatus 100 to the host computer 212 which is an information processing apparatus, and controls communications between the image scanning apparatus 100 and the host computer 212. For example, in a case where a scan operation command is requested from the host computer 212 via a USB cable, the USB I/F 209 receives a request signal and stores it in the RAM 203. The scanner unit 210 generates digital image data by scanning an original document 119 set on the image scanning apparatus 100 and transfers the digital image data to the RAM 203 via the scanner-unit I/F 207 of the control unit 201. In a case of having an expensive configuration, the UI unit 211 includes a liquid crystal display unit having a touch panel capability, operation keys, and the like, and functions as a receiving unit that receives user operations. In a case of having an inexpensive configuration, the UI unit 211 may include only an operation key for push scanning. The following description assumes that the image scanning apparatus 100 of the present embodiment has an inexpensive configuration.

<Block Diagram of the Image Scanning Apparatus>

Figure 3:
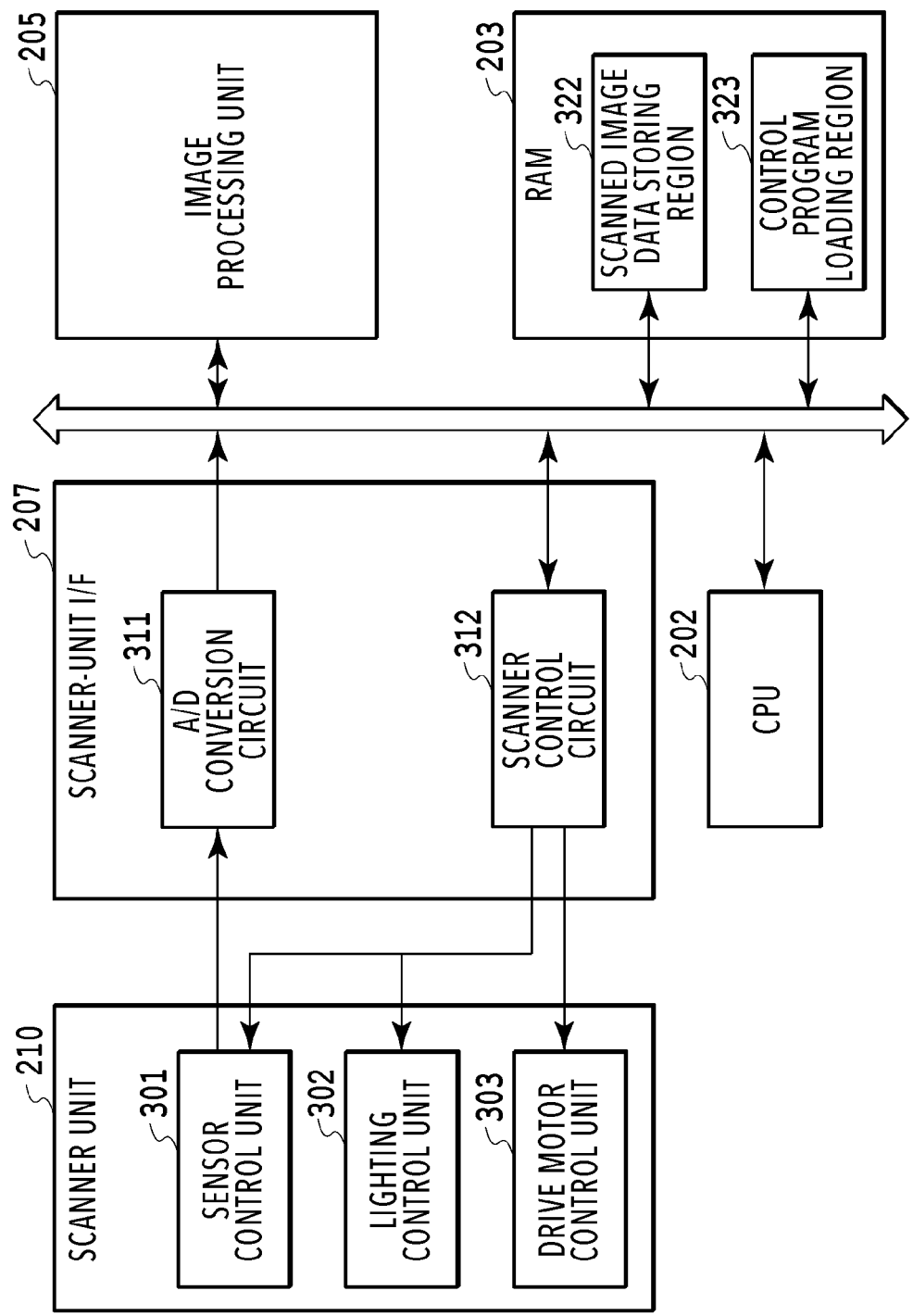
FIG. 3 is a block diagram showing part of the image scanning apparatus.

FIG. 3 is a block diagram showing part of the overall block diagram of the image scanning apparatus 100, the part being used in forming digital image data by executing a scan operation.

The scanner unit 210 includes a sensor control unit 301, a lighting control unit 302, and a drive motor control unit 303. The sensor control unit 301 controls the operation of the image sensor array 113 described earlier. The lighting control unit 302 controls lighting of the LED light guide unit 111 described earlier. The scanner-unit I/F 207 includes an A/D conversion circuit 311 and a scanner control circuit 312. The A/D conversion circuit 311 converts analog data obtained from the sensor control unit 301 into digital data. Using a scanner control module 411 to be described later, the scanner control circuit 312 controls the drive motor control unit 303 to drive a motor. The RAM 203 is provided with a scanned image data storing region 322 and a control program loading region 323.

<Software Configuration Diagram of the Image Scanning Apparatus>

Figure 4:
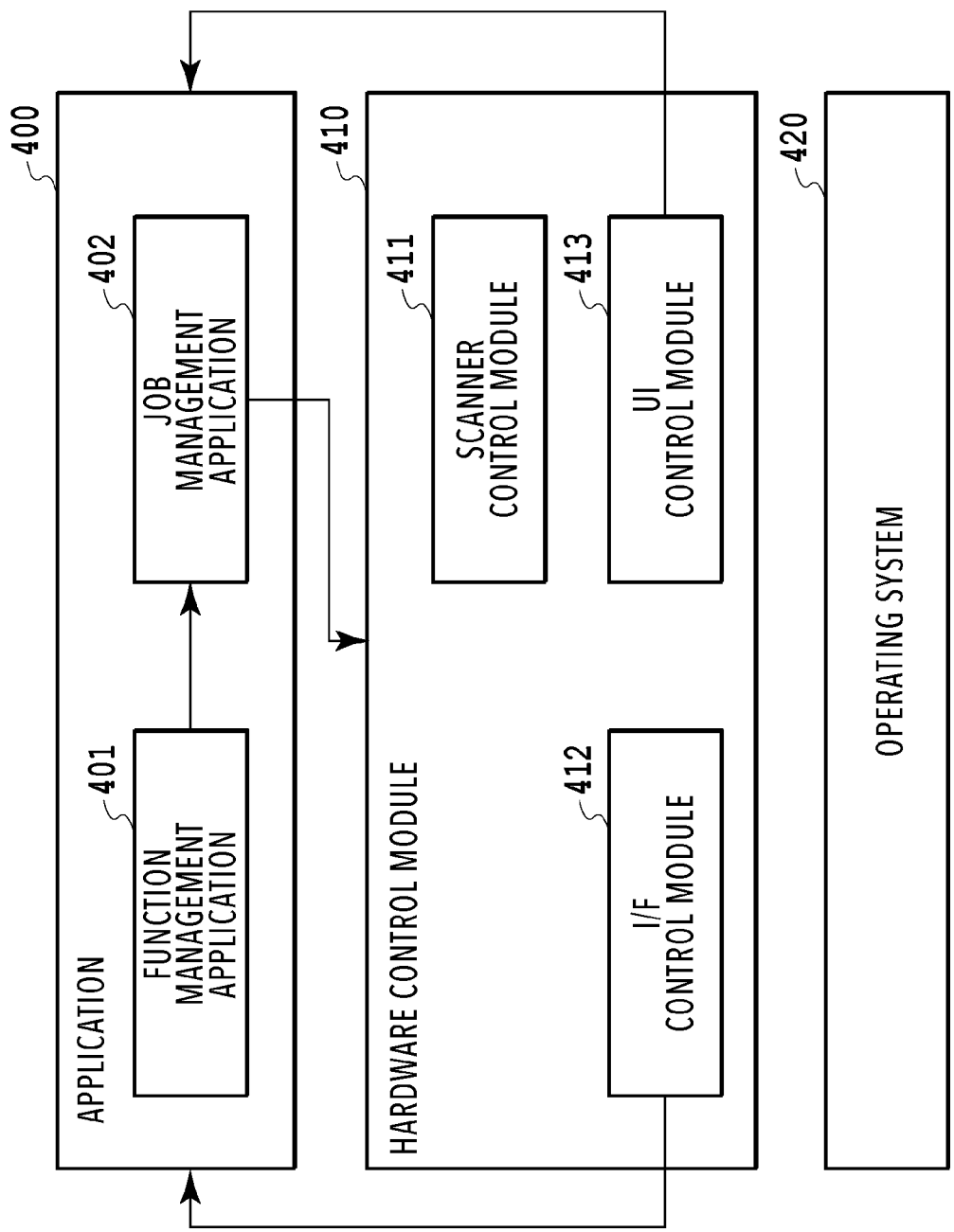
FIG. 4 is a software configuration diagram of a control program for controlling hardware modules.

FIG. 4 is a software configuration diagram of a control program which is loaded into the RAM 203 of the image scanning apparatus 100 to control each hardware module. The control program includes an application 400, a hardware control module 410, and an operating system 420 of the image scanning apparatus 100. The application 400 includes a function management application 401 and a job management application 402. The hardware control module 410 includes a group of software components for controlling an I/F with a physical device. For example, the hardware control module 410 includes the scanner control module 411, an I/F control module 412, and a UI control module 413. The hardware control module 410 may include other control modules as needed. The operating system 420 provides basic functions for the control unit 201 described earlier to execute the control program.

A description is given below of how each software component functions in scanning an original document. The application 400 operates each device via the hardware control module 410. For example, in a case where information inputted from the I/F control module 412 is analyzed and turns out to be a scan operation command, the function management application 401 for executing scanning is executed. The function management application 401 executes a scan job in the job management application 402. The job management application 402 executes a scan operation by the scanner unit 210 using the scanner control module 411 of the hardware control module 410 and stores digital image data obtained as a result in the RAM 203. In a case where the digital image data needs any image processing, correction, or both before being stored in the RAM 203, the scanner control module 411 executes necessary processing using the image processing unit 205. After being accumulated in the RAM 203, the digital image data is returned to the host computer 212 via the I/F control module 412.

An output from each sensor in the image sensor array 113 described earlier is stored in the RAM 203. An output from each sensor in the single-line image sensor array 113 is used or not used as scanned data depending on the resolution designated by the job management application 402. Once a scan operation range is designated, the scanner control module 411 first designates a scan operation range in the main scanning direction for the image sensor array 113. This determines the range of sensors whose outputs will be used among the outputs from the image sensor array 113.

The scanner control module 411 also designates a scan operation range in the direction in which the CIS unit 117 is driven. This determines how much the CIS unit 117 moves in the drive direction in scanning. Upon receipt of a scan operation command from the scanner control module 411 via the scanner-unit I/F 207, the scanner unit 210 lights the LED light guide unit 111. Then, the CIS unit 117 scans the original document 119 set on the contact glass 115 while moving. The CIS unit 117 of the present embodiment has the image sensor array 113 formed of a single-line sensor portion.

The scanner control module 411 changes incident light among R (Red), G (Green), and B (Blue), obtains outputs corresponding to the respective colors, and combines the obtained outputs, thereby obtaining color digital image data. In this event, during the execution of scanning of the original document 119, the lighting color switches among R, G, and B, and reflection light from the original document 119 is guided to the image sensor array 113 via the rod lens array 112. The reflection light from the original document 119 enters the image sensor array 113, and consequently, outputs corresponding to the respective colors are obtained. The scanner control module 411 stores the obtained outputs in the RAM 203.

The scanner control module 411 generates digital image data from outputs obtained using the image processing unit 205. Once scanning of the original document 119 set on the contact glass 115 is complete and generation of digital image data on the original document 119 is complete, the scanner control module 411 moves the CIS unit 117 to the standby position to get ready to scan the next original document.

The above is a description of how each software component functions in scanning an original document.

<Overall System Configuration>

Figure 5:
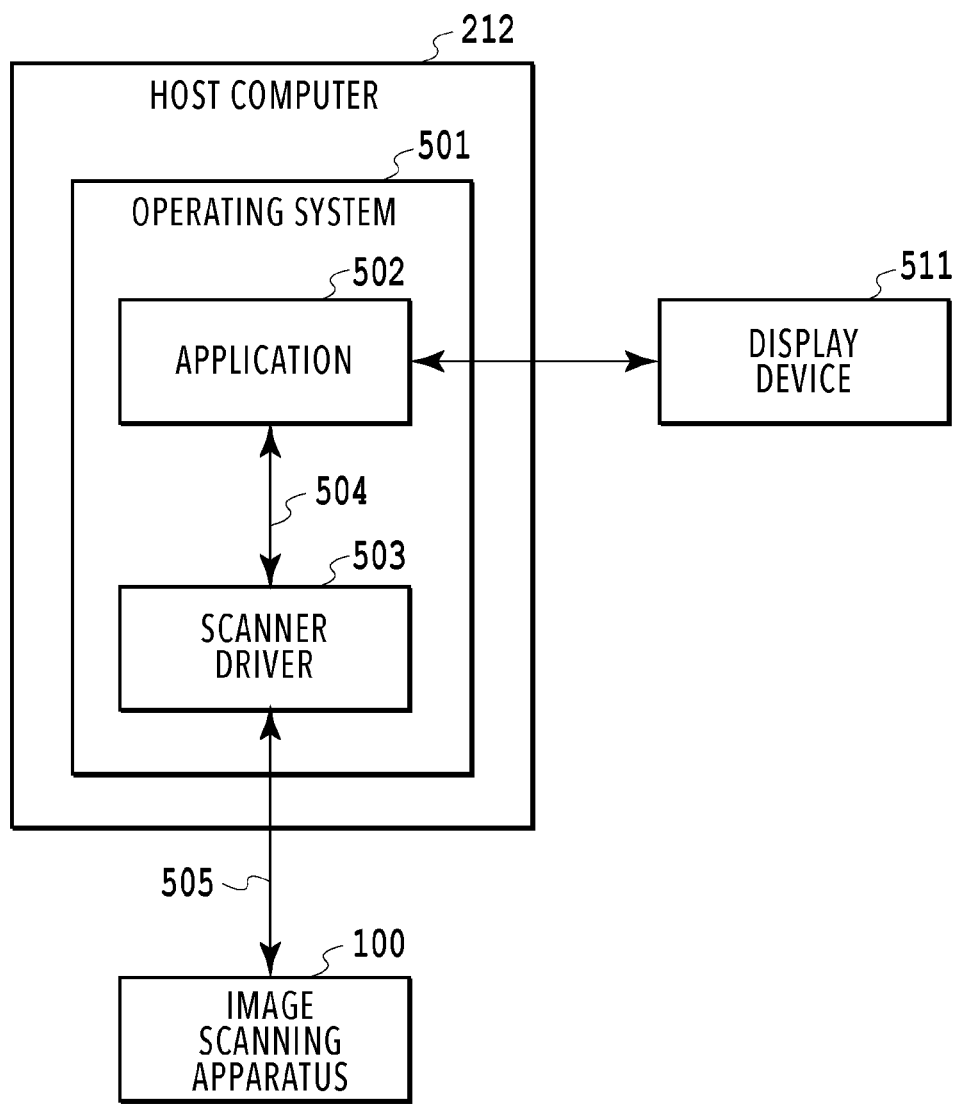
FIG. 5 is a configuration diagram of a system in which a host computer and the image scanning apparatus are connected.

FIG. 5 is a configuration diagram showing a system (an image scanning system) in which the host computer 212, the image scanning apparatus 100, and a display device 511 are connected.

First, the configuration of each apparatus is described. The host computer 212 includes an operating system 501. The operating system 501 includes an application 502 and a scanner driver 503. The image scanning apparatus 100 is connected to the scanner driver 503 of the operating system 501 via the USB I/F 209. Also, the display device 511 is connected to the application 502 of the operating system 501.

Next, the functions of software in the host computer 212 are described. The application 502 is software operating on the operating system 501. The application 502 sends such commands as a scan operation command to the scanner driver 503 in conformity with predetermined application program interface (API) specifications 504. Then, as a response to the command, the application 502 receives digital image data and status information on the image scanning apparatus 100. Further, the application 502 also performs other processing such as displaying the scanned digital image data or the status information on the display device 511 and storing the scanned digital image data in the host computer 212 as a file. The scanner driver 503 is software operating on the operating system 501, and upon receipt of a command from the application 502, communicates with the image scanning apparatus 100 via the USB I/F 209 in conformity with a predetermined communication protocol 505. In this way, transmission of a command such as a scan operation command to the image scanning apparatus 100 and reception of digital image data and status information from the image scanning apparatus 100 can be performed.

Now, driver software standardly installed in an operating system and commonly used in recent years does not support function selection, status representation, and the like for the hardware configuration specific to the image scanning apparatus 100. Thus, in a case where such driver software standardly installed in an operating system is used as the scanner driver 503, the scanner driver 503 may not be able to obtain information properly. In other words, there may be a case where the scanner driver 503 cannot receive information corresponding to the hardware configuration specific to the image scanning apparatus 100 in conformity with the API specifications 504 and the communication protocol 505 defined in the driver software standardly installed in the operating system.

In this respect, function selection, status representation, and the like can be supported by standard driver software originally installed in the operation system in a case where they are for a typical hardware configuration of the image scanning apparatus 100. However, only dedicated driver software can support function selection, status representation, and the like for a configuration unique to the image scanning apparatus 100. The lock member 140 of the image scanning apparatus 100 of the present embodiment is not a hardware configuration typically provided in an image scanning apparatus. In other words, the lock member 140 of the present embodiment is a member not supported by driver software standardly installed in an operating system. Thus, function selection and status representation for the lock member 140 cannot be supported by driver software standardly installed in an operating system. In a case where a user starts scanning using the image scanning apparatus 100 without noticing that the lock member 140 is being inserted in the lock receiver opening 141, the CIS unit 117 does not move, and hence an error occurs. In a case where a user is not looking at the status of the image scanning apparatus 100 at all in such an event, the user may not notice the occurrence of the error. Also, in a case where the user is not familiar with the configuration unique to the image scanning apparatus 100, the user may not be able to check the cause of the error.

Thus, in the event of an error occurrence, the image scanning apparatus 100 of the present embodiment transmits explanation image data to the host computer 212 instead of original document image data, the explanation image data being an image that explains the error occurrence using a drawing, text, or the like. In other words, the image scanning apparatus 100 transmits the explanation image data to the host computer 212 using the same mechanism as the mechanism for transmitting the original document image data. The host computer 212 displays a preview of a scanned image based on the image data transmitted from the image scanning apparatus 100, and consequently, the explanation image based on the explanation image data is displayed on the display device 511. In this way, for the host computer 212 side, the processing for displaying an image based on image data transmitted thereto is processing that the host computer 212 usually performs. Thus, an explanation image based on explanation image data transmitted from the image scanning apparatus 100 can be displayed on the display device 511 without introduction of a mechanism corresponding to dedicated driver software into the host computer 212 side.

<Flow of Scan Processing>

Figure 6B:
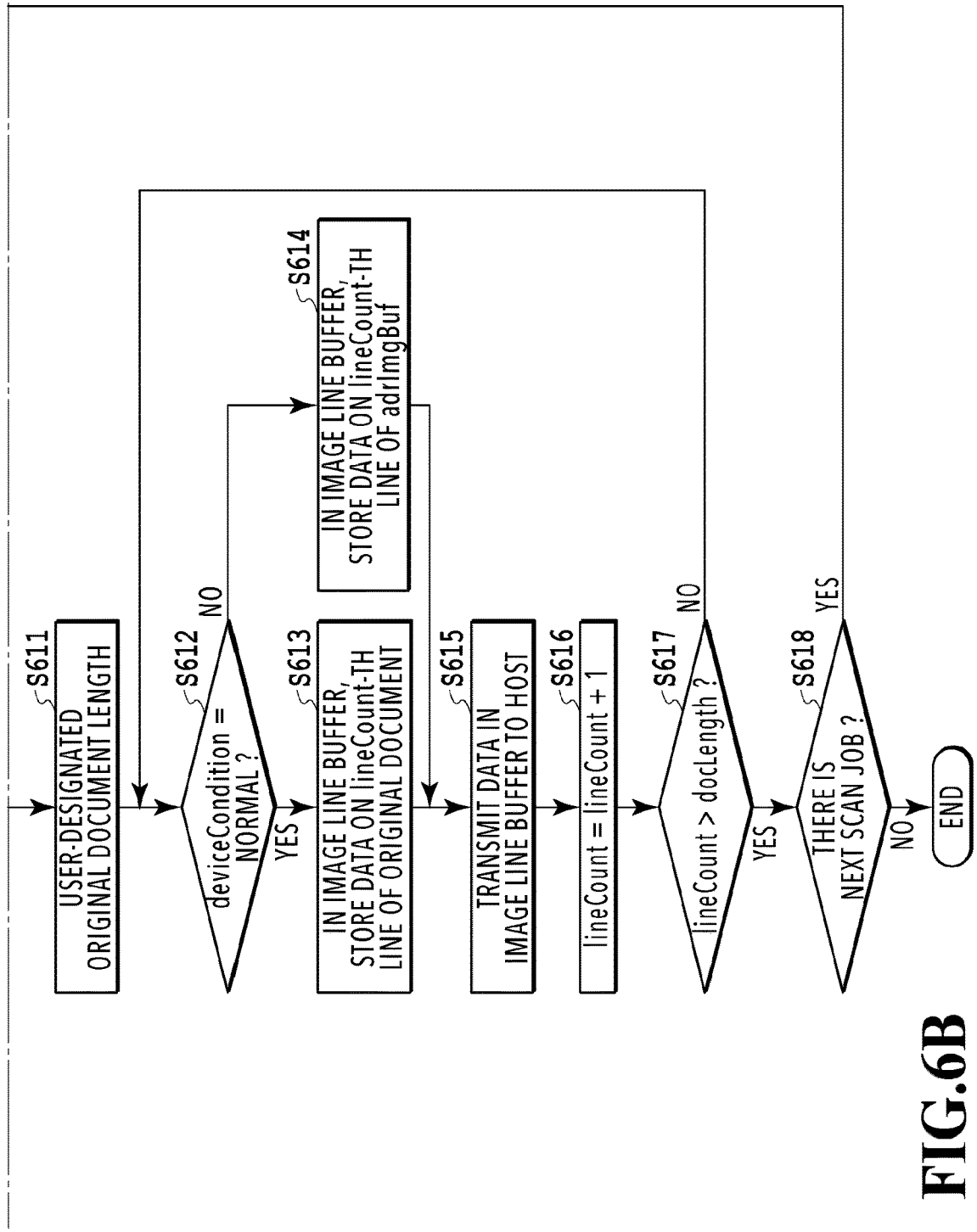

Scan processing in the present embodiment is described using FIG. 6. FIGS. 6A and 6B are totally a flowchart illustrating the flow of scan processing performed by the image scanning apparatus 100 using the control unit 201. The processing of this flowchart is implemented by the CPU 202 by loading, into the RAM 203, program code stored in the ROM 204 or the like in the image scanning apparatus 100 and executing the program code. Note that variables described in the flowchart are variables provided in the RAM 203.

In S601, the CPU 202 detects that the image scanning apparatus 100 has been turned on by a user. In S602, the CPU 202 starts power-on processing which is processing performed to activate the image scanning apparatus 100 to bring the image scanning apparatus 100 to a status ready to receive a user operation (a power-on status).

In S603, the CPU 202 determines whether the image scanning apparatus 100 has been powered on normally. For example, the CPU 202 determines whether the image scanning apparatus 100 has been powered on normally by using a publicly-known error detection unit to detect errors such as a USB cable connection error. If the image scanning apparatus 100 has been powered on normally, processing proceeds to S604. Meanwhile, if the image scanning apparatus 100 has not been powered on normally, processing proceeds to S605.

In S604, the CPU 202 plugs NORMAL into a variable deviceCondition indicative of the status of the image scanning apparatus 100, NORMAL meaning that the image scanning apparatus 100 has been powered on normally. After the processing of this step ends, processing proceeds to S609.

In S605, the CPU 202 plugs ERROR into the variable deviceCondition, ERROR meaning that the image scanning apparatus 100 has not been powered on normally. After the processing of this step ends, processing proceeds to S606.

In S606, the CPU 202 determines whether the error occurring is an error caused by insertion of the lock member 140 to fixate the CIS unit 117 (hereinafter referred to as a lock error) in the power-on processing. If the error occurring is a lock error, processing proceeds to S607. Meanwhile, if the error occurring is not a lock error, processing proceeds to S608.

Figure 7A:
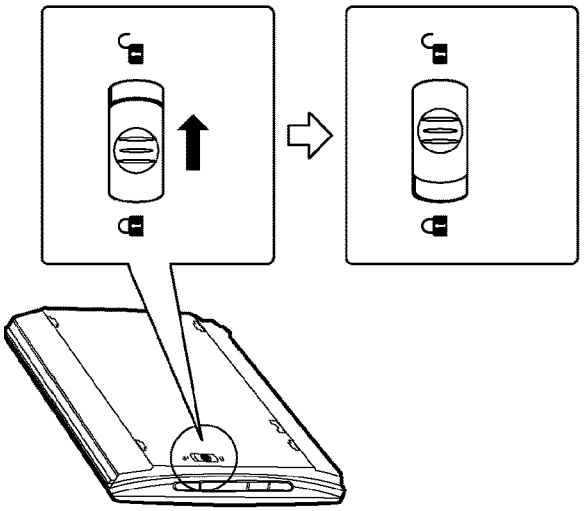
FIGS. 7A and 7B are diagrams showing an image represented by explanation image data transmitted to the host computer.

In S607, the CPU 202 stores the beginning address of explanation image data 701 indicating that a lock error has occurred during power-on processing, in a variable adrImgBuf used for reference to image data. Using FIG. 7A, a description is now given of the explanation image data 701 of the present embodiment. FIG. 7A is a diagram showing an example of explanation image data transmitted from the image scanning apparatus 100 to the host computer 212 in the event of a lock error occurrence. This example shows that a user can unlock the CIS unit 117 by sliding a lock switch from left to right. Once the beginning address of the explanation image data 701 is stored in the variable adrImgBuf, the CPU 202 stores data on this beginning address in an image line buffer in processing of S614 to be described later. As a result, by reading the image line buffer, the CPU 202 can display the explanation image data 701 on the display device 511 as scanned image data. Details will be described in S614. After the processing of S607 ends, processing proceeds to S609.

Figure 7B:
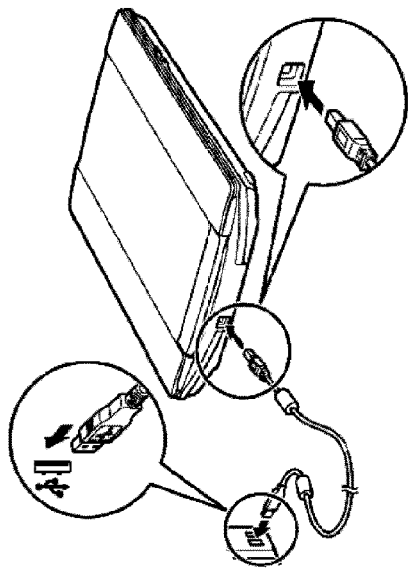

In S608, the CPU 202 stores the beginning address of explanation image data 702 indicating that an error due to electric circuit malfunction has occurred during power-on processing, in the variable adrImgBuf which is a storage area for scanned image data. An error due to electric circuit malfunction is hereinafter referred to as an "electric circuit error." For example, an electric circuit error is caused by, e.g., disconnection of a USB cable for connecting the image scanning apparatus 100 and the host computer 212 to each other. Using FIG. 7B, a description is now given of the explanation image data 702 of the present embodiment. FIG. 7B is a diagram showing an example of explanation image data transmitted from the image scanning apparatus 100 to the host computer 212 in the event of an electric circuit error occurrence. This example shows that a user may be able to solve the electric circuit error by reconnecting the USB cable. After the processing of S608 ends, processing proceeds to S609.

After the power-on processing is completed in S609, in S610 the CPU 202 determines whether a scan execution command has been received. The determination is repeated until a scan execution command is received, and once the command is received, processing proceeds to S611.

In S611, the CPU 202 plugs an initial value "1" into lineCount that counts up every time the image sensor array 113 outputs output data on a line in the main scanning direction. Then, the CPU 202 obtains information on the length in the sub scanning direction designated by a user and sets the information in a variable docLength.

In S612, the CPU 202 determines whether deviceCondition is NORMAL. If deviceCondition is NORMAL, processing proceeds to S613. Meanwhile, if deviceCondition is not NORMAL, processing proceeds to S614.

In S613, the CPU 202 stores, in the image line buffer in the RAM 203, output data on the sub-scan lineCount-th line of the original document 119 in the main scanning direction. Specifically, the CIS unit 117 performs a scan in the sub scanning direction and stores, in the image line buffer in the RAM 203, scanned image data on one line of the original document 119 in the main scanning direction, the line corresponding to the line count of the sub scanning direction. In other words, this step is regular scan processing performed by the image scanning apparatus 100 scanning the original document 119. After the processing of S613 ends, processing proceeds to S615. Note that as a result of this processing, scanned image data on one line is stored in the buffer sequentially.

In S614, the CPU 202 stores, in the image line buffer in the RAM 203, output data on one line of the explanation image data in the main scanning direction, the line corresponding to the line count of the sub scanning direction, the explanation image data being stored in the beginning address of the variable adrImgBuf. As a result of the processing of this step, in the event of a lock error occurrence, line data on one line of the explanation image data 701 is stored in the image line buffer in the RAM 203. Meanwhile, in the event of an electric circuit error occurrence, line data on one line of the explanation image data 702 is stored in the image line buffer in the RAM 203. Thus, even in a case where deviceCondition is not NORMAL, data on one line is stored in the image line buffer, like in the processing of S613. After the processing of S614 ends, processing proceeds to S615.

In S615, the CPU 202 transmits the data in the image line buffer to the host computer 212 via the USB I/F 209. In other words, the data (line data) stored in the image line buffer as a result of the processing of S613 or S614 is transmitted to the host computer 212. The image scanning apparatus 100 of the present embodiment is thus configured to sequentially transmit line data to the host computer 212 line by line in response to a scan command.

In S616, the CPU 202 increments (+1) lineCount. In S617, the CPU 202 compares lineCount with docLength and determines whether line data covering the sub scanning direction length designated by the user have all been transmitted to the host computer 212. By this determination processing, it can be checked whether scans have been performed to cover the original document length designated by the user. Note that in performing the processing of S614, the CPU 202 plugs the size (length) of the explanation image data into docLength. This is because the vertical length of the explanation image data does not necessarily match the vertical length of the original document 119 designated by the user.

If data on the lines covering the sub scanning direction length designated by the user have all been transmitted to the host computer 212, processing proceeds to S618. Meanwhile, if data on the lines covering the sub scanning direction length designated by the user have not all been transmitted to the host computer 212, processing proceeds back to S612 and repeats the processing of S612 to S617 until data on the lines covering the sub scanning direction length are transmitted. By repeating the processing from S612 to S617, line data covering docLength are sequentially transmitted to the host computer.

In S618, the CPU 202 determines whether there is a next scan job. If there is a next scan job, processing proceeds back to S610 and repeats the processing from S610 to S618. Meanwhile, if there is no next scan job, the CPU 202 ends the scan processing.

As thus described, in the present embodiment, upon detection of a malfunction in the image scanning apparatus 100, explanation image data is transmitted to the host computer instead of original document image data. Thus, using the same mechanism for regular scan processing of sending original document image data to the host computer, the image scanning apparatus 100 transmits explanation image data as if the explanation image data were image data obtained as a result of scanning. In other words, the scanner driver 503 of the host computer 212 obtains an explanation image as a scanned image from the image scanning apparatus 100 in response to a scan job. As a result, an explanation image is displayed as a scanned image on the display device 511 of the host computer 212. As a result, an indication of an error occurrence in the image scanning apparatus can be conveyed to a user by using driver software standardly installed in the operating system that cannot handle information related to a hardware configuration unique to the image scanning apparatus.

Thus, a function for conveying the status of an image scanning apparatus to a user can be implemented without extending the function of the application 502, which can contribute to lower design costs. Also, even in a case where an image scanning apparatus does not have a display unit, a user can be notified of the status of the apparatus. Thus, the image scanning apparatus can be provided inexpensively. Further, in a case where an image scanning apparatus has a display unit, the status of the image scanning apparatus can be shown on the more-sophisticated display device 511 connected to the host computer 212, which can be more convenient to the user. Also, the user can check the status of the image scanning apparatus without paying attention to a change in what is shown on a dedicated status management screen or the application, which is highly convenient to the user.

Thus, according to the present embodiment, a user can easily check the status of the image scanning apparatus. Then, without cost increase, the status of the image scanning apparatus can be conveyed to a user in a way comprehensible to the user.

Embodiment 2

Embodiment 1 has described a mode where the status of the image scanning apparatus 100 during power-on processing is checked. Embodiment 2 described below is not limited to checking the status during power-on processing. Specifically, an embodiment for conveying to a user (or notifying the user) that an error has occurred in the event of an error occurrence is described below. Note that the configuration of the image scanning system is the same as the example described in Embodiment 1 and is therefore not described.

Figure 8:
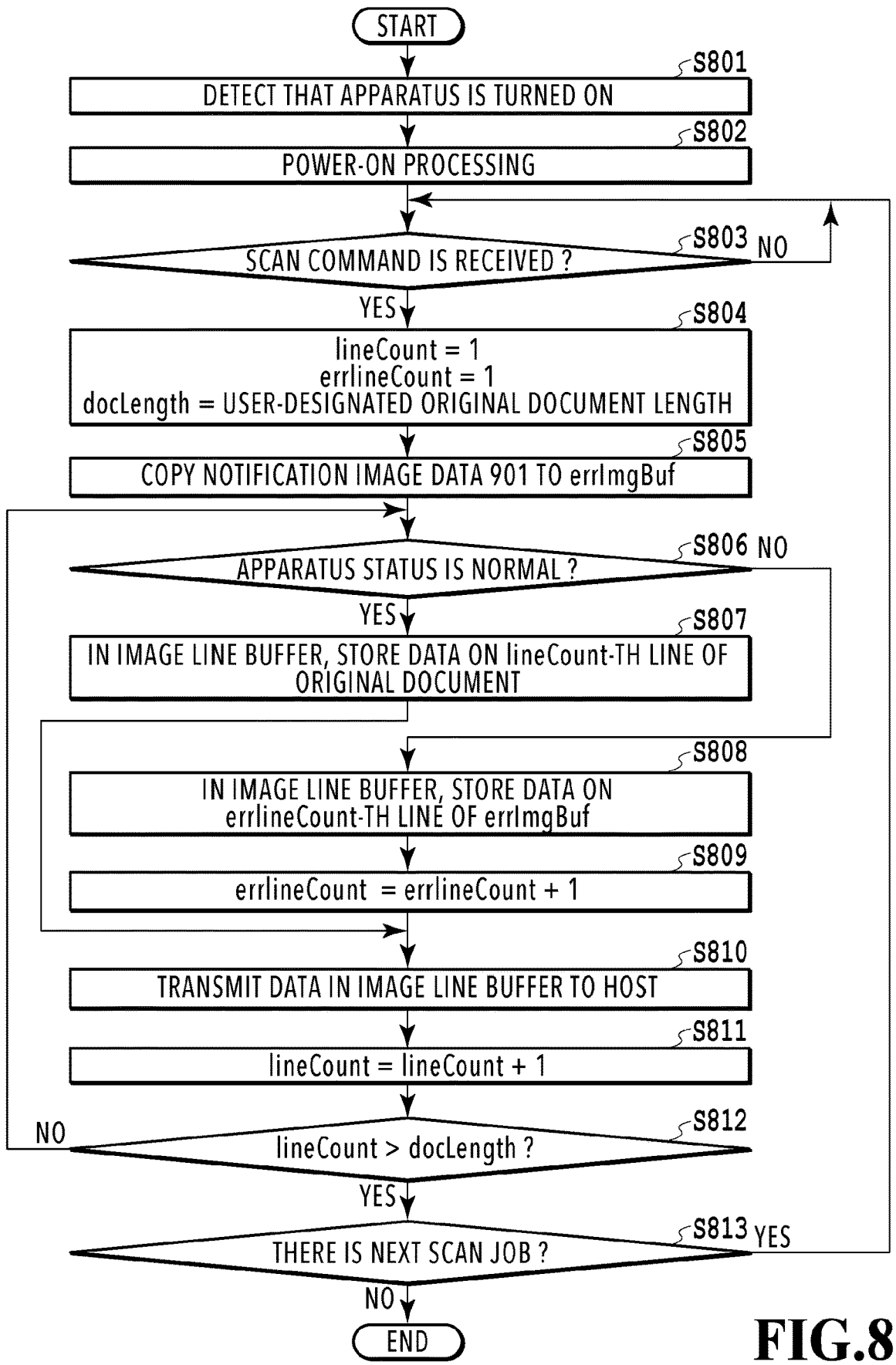
FIG. 8 is a diagram showing an example flowchart illustrating scan processing.

Scan processing of the present embodiment is described using FIG. 8. FIG. 8 is a flowchart illustrating the flow of scan processing performed by the image scanning apparatus 100 using the control unit 201. The processing of this flowchart is implemented by the CPU 202 by loading, into the RAM 203, program code stored in the ROM 204 in the image scanning apparatus 100 and executing the program code. The following omits descriptions for the same configurations as those in Embodiment 1, focusing on differences from Embodiment 1.

<Flow of Scan Processing of Embodiment 2>

In S801, the CPU 202 detects that the image scanning apparatus 100 has been turned on by a user. In S802, the CPU 202 starts power-on processing. In S803, the CPU 202 determines whether a scan execution command has been received. If the command has been received, processing proceeds to S804. Meanwhile, if no such command has been received, the CPU 202 repeats the processing of this step until the command is received.

In S804, the CPU 202 resets a sub-scan counter lineCount that counts up upon every output of data on one line in the main scanning direction to 1, and resets a sub-scan counter errlineCount for notification image data 901 transmitted upon occurrence of an error to 1. Further, the CPU 202 obtains sub-scan length information designated by the user and sets the information in the variable docLength.

In S805, the CPU 202 copies notification image data to errImgBuf, the notification image data being image data transmitted to the host computer 212 in the event where an error occurs after scanning is started. As will be described later, errImgBuf is a variable used in a case where the apparatus status is not normal.

Figure 9A:
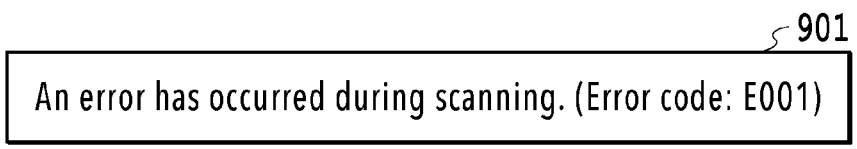
FIGS. 9A to 9C are diagrams showing an example of an image represented by notification image data transmitted to the host computer.
Figure 9B:
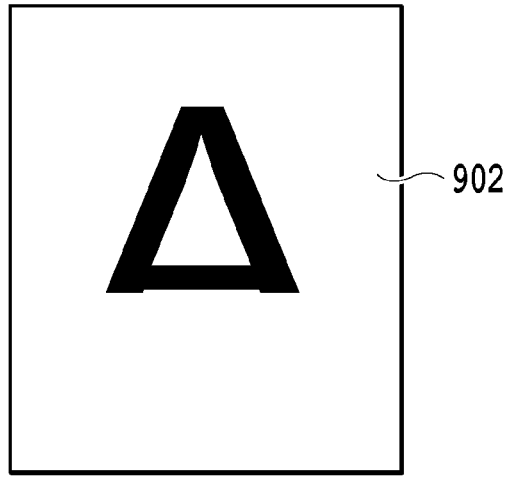
Figure 9C:
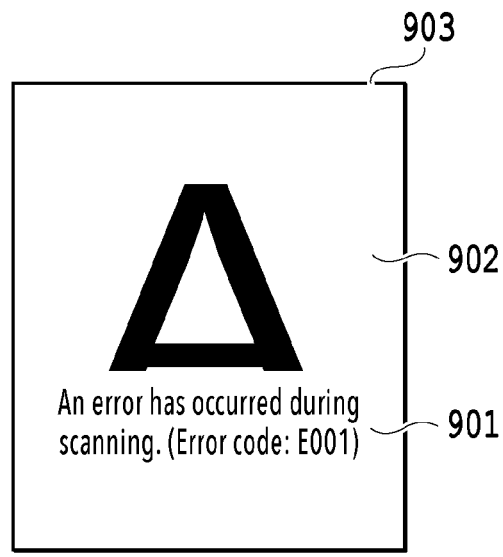

FIGS. 9A to 9C are diagrams showing an image represented by notification image data and images represented by original document image data transmitted to the host computer 212 in the event where an error occurs during execution of scanning. Using FIG. 9A, notification image data of the present embodiment is described. The notification image data 901 in FIG. 9A is an example of notification image data used to notify a user that an error has occurred during execution of scanning. For example, as an example of the notification image data 901, image data showing text for notifying a user of an error occurrence and a code for that error, such as "An error has occurred during scanning. (Error code: E001)" is used. The vertical length of the notification image data 901 may be the length of one line or the length of a plurality of lines.

Referring back to FIG. 8, in S806, the CPU 202 determines whether the apparatus status of the image scanning apparatus 100 (deviceCondition) is normal (NORMAL). If the apparatus status is normal, processing proceeds to S807. Meanwhile, if the apparatus status is not normal, processing proceeds to S808. For example, in a case where an error such as an error due to malfunction of a scanner sensor or an error due to malfunction of a motor occurs during scanning, it is determined that the apparatus status is not normal, and processing proceeds to S808.

In S807, the CPU 202 stores, in the image line buffer in the RAM 203, output data on the sub-scan lineCount-th line of the original document 119 in the main scanning direction. In other words, line data on the original document 119 in the main scanning direction corresponding to the line count for the sub scanning direction is stored in the image line buffer in the RAM 203. After the processing of this step ends, processing proceeds to S810.

In S808, the CPU 202 stores data on the errlineCount-th line of errImgBuf in the image line buffer in the RAM 203. Specifically, the CPU 202 stores, in the image line buffer in the RAM 203, output data on the errlineCount-th line of the notification image data 901 in the main scanning direction stored in errImgBuf. After the processing of this step ends, processing proceeds to S809.

In S809, the CPU 202 increments (+1) errlineCount. After the processing of this step ends, processing proceeds to S810. In S810, the CPU 202 reads data in the image line buffer and transmits the data to the host computer 212 via the USB I/F 209. In S811, the CPU 202 increments (+1) lineCount.

In S812, the CPU 202 compares lineCount with docLength and determines whether data on the lines covering the sub scanning direction length designated by the user have all been transmitted to the host computer 212. If data on the lines covering the length in the sub scanning direction designated by the user have all been transmitted sequentially to the host computer 212, processing proceeds to S813. Meanwhile, if data on the lines covering the sub scanning direction length designated by the user have not all been transmitted to the host computer 212, processing proceeds back to S806 and repeats the processing of S806 to S812 until data on the lines covering the sub scanning direction length are sequentially transmitted.

A description is further given using a concrete example. Original document data 902 in FIG. 9B is an example of original document data successfully scanned from the start of scanning until the occurrence of an error. In other words, FIG. 9B shows the original document data 902 transmitted to the host computer as a result of repetition of the processing of S806, S807, and S810. In a case where an error occurs at this time point, processing proceeds from S806 to S808, and processing is repeated until the transmission of the notification image data 901 is completed. FIG. 9B shows original document image data (scanned image data) on part of a letter "A" obtained until an error occurs in the midst of the scanning of the letter. An original document image 903 in FIG. 9C is an example where the notification image data 901 is transmitted as original document image data following the original document data 902 in FIG. 9B as a result of S806 to S808 and is displayed on the display device 511. As shown in FIG. 9C, the lowermost line data of the original document data 902 and the uppermost line data of the notification image data 901 are displayed on the display device 511 continuously so that there is no spatial space therebetween. As a result, as shown in FIG. 9C, the original document image 903 is displayed on the display device 511 as if the original document image 903 were a single original document image. In other words, original document image data including the notification image data is transmitted to the host computer 212, and based on this data, an original document image including a notification image is displayed on the display device 511. Note that after the notification image data are all transmitted in S808, the repeated processing is ended once the count value satisfies the condition in S811, and processing proceeds to S813.

In S813, the CPU 202 determines whether there is a next scan job. If there is a next scan job, processing proceeds back to S803 and repeats the processing from S803 to S813. Meanwhile, if there is no next scan job, the scan processing is ended.

In the meantime, the host computer 212 executes control to display the line data obtained by scanning on the display device 511. For example, there are the following two patterns as to how the host computer 212 controls display of the original document image data on the display device 511.

In a first pattern, the host computer 212 displays the line data transmitted from the image scanning apparatus 100 on the display device 511 one line at a time as image data. In this case, the line data obtained by scanning of the original document 119 is displayed on the display device 511 one line at a time. In a second pattern, the host computer 212 stores line data transmitted from the image scanning apparatus 100 and then later displays image data on the display device 511 at once. In either case, a notification image is displayed on the display device 511 in the present embodiment, allowing a user to be notified of an error in the event where an error occurs during execution of scanning.

As thus described, according to the present embodiment, a user can easily check the status of the image scanning apparatus. Then, without cost increase, the status of the image scanning apparatus can be conveyed to a user in a way comprehensible to the user.

Embodiment 3

Figure 10:
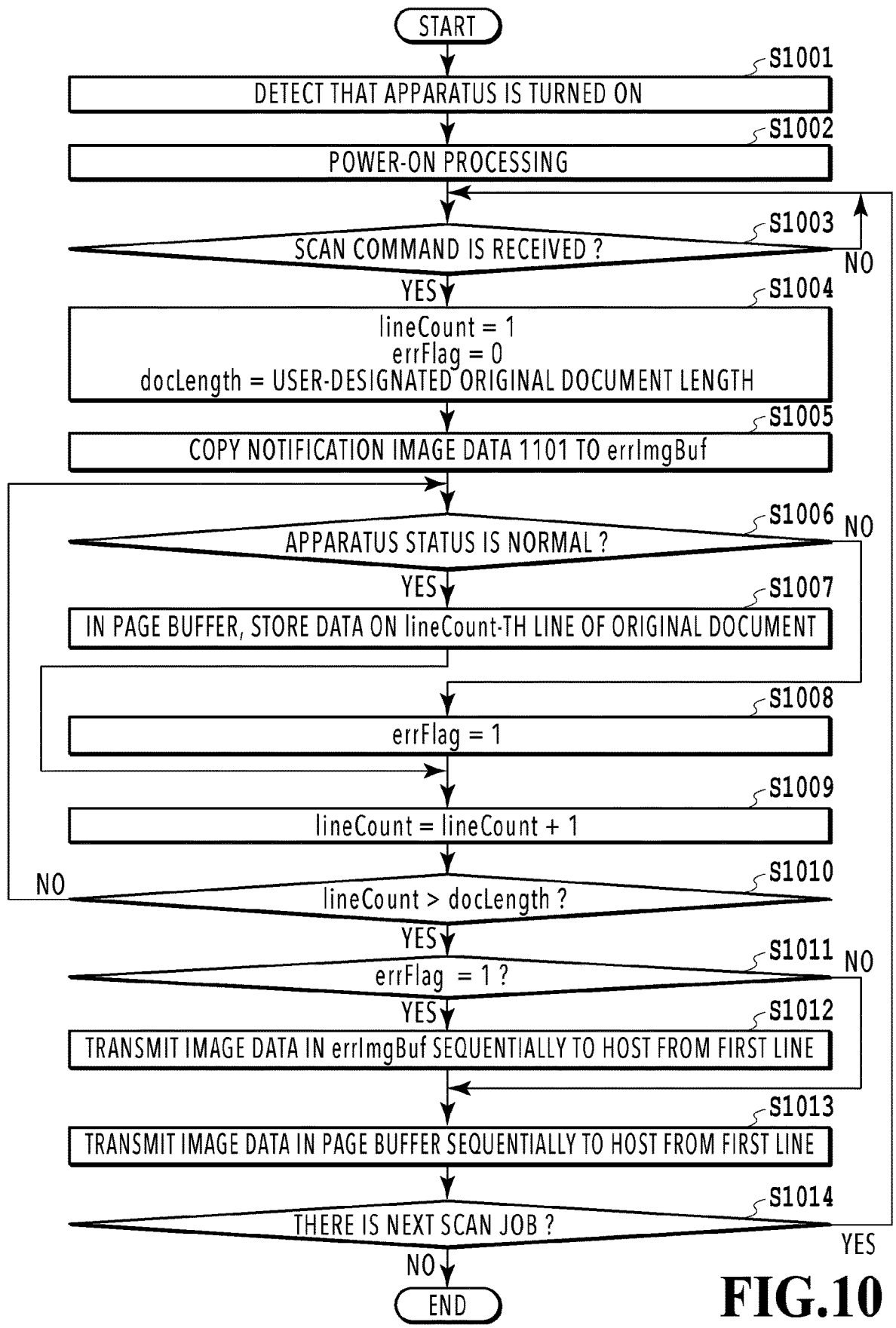
FIG. 10 is a diagram showing an example flowchart illustrating scan processing.

Scan processing of Embodiment 3 is described using FIG. 10. FIG. 10 is a flowchart illustrating the flow of scan processing performed by the image scanning apparatus 100 using the control unit 201. The processing of this flowchart is implemented by the CPU 202 by loading, into the RAM 203, program code stored in the ROM 204 in the image scanning apparatus 100 and executing the program code. The following omits descriptions for the same configurations as those in Embodiment 1, focusing on differences from Embodiment 1.

Embodiment 2 has described a technique for displaying notification image data following original document image data. Embodiment 3 describes a technique for displaying notification image data on the first line and then displaying scanned original document image data on and after the second line.

<Flow of Scan Processing of Embodiment 3>

In S1001, the CPU 202 detects that the image scanning apparatus 100 has been turned on by a user. In S1002, the CPU 202 starts power-on processing.

In S1003, the CPU 202 determines whether a scan execution command has been received. If the command has been received, processing proceeds to S1004. Meanwhile, if no such command has been received, the CPU 202 repeats the processing of this step until the command is received.

In S1004, the CPU 202 resets a sub-scan counter lineCount that counts up upon every output of data on one line in the main scanning direction to 1, and resets errFlag which is a flag set upon occurrence of an error to 0. Then, the CPU 202 obtains sub-scan length information designated by the user and sets that information in the variable docLength.

In S1005, the CPU 202 copies notification image data to errImgBuf. Notification image data is the same as the example described in Embodiment 2. In S1006, the CPU 202 determines whether the apparatus status of the image scanning apparatus 100 (deviceCondition) is normal (NORMAL). If the apparatus status is normal, processing proceeds to S1007. Meanwhile, if the apparatus status is not normal, processing proceeds to S1008. For example, in a case where an error such as an error due to malfunction of a scanner sensor or an error due to malfunction of a motor occurs during scanning, it is determined that the apparatus status is not normal, and processing proceeds to S1008.

In S1007, the CPU 202 stores, in a page buffer, line data obtained by line-by-line scanning of the original document 119. Specifically, the CPU 202 stores, in a page buffer in the RAM 203, output data on the sub-scan lineCount-th line of the original document 119 in the main scanning direction.

In S1008, as information indicating that an error has occurred in the image scanning apparatus 100, the CPU 202 sets errFlag to 1. In S1009, the CPU 202 increments (+1) lineCount. In S1010, the CPU 202 compares lineCount with docLength and determines whether image scanning is completed for the sub-scan length designated by the user. If the scanning is complete, processing proceeds to S1011. Meanwhile, if the scanning is not complete, processing proceeds back to S1006 and performs the processing on the next line in the main scanning direction. Thus, in the present embodiment, unlike Embodiment 2 that stores line data in the image line buffer and sequentially transmits the line data, data on each line is stored in the page buffer. Note that in the event of an error occurrence, after increments are made repeatedly in S1009, processing proceeds to S1011. In other words, in the event of an error occurrence, data scanned up until that point is being stored in the page buffer.

In S1011, the CPU 202 determines whether information indicative of an error occurrence in the image scanning apparatus 100 has been generated. For example, the CPU 202 refers to the flag generated in S1008 and determines whether errFlag is set to 1. If information indicative of an error occurrence in the image scanning apparatus 100 has been generated (e.g., if errFlag is set to 1), processing proceeds to S1012. Meanwhile, if information indicative of an error occurrence in the image scanning apparatus 100 has not been generated (e.g., if errFlag is not set to 1), processing proceeds to S1013.

In S1012, the CPU 202 transmits notification image data 1101 to the host computer 212 one line at a time. Specifically, the CPU 202 transmits the notification image data 1101 stored in errImgBuf to the host computer 212 via the USB I/F 209 sequentially from the first line. After the processing of S1012 ends, processing proceeds to S1013.

In S1013, the CPU 202 reads line data stored in the page buffer and transmits the line data sequentially to the host computer. Specifically, the CPU 202 transmits the notification image data 1101 stored in the page buffer to the host computer 212 via the USB I/F 209 sequentially from the first line. Note that in a case where processing proceeds from S1012 to S1013, after transmitting the notification image data 1101 to the host computer 212 sequentially from the first line, the CPU 202 transmits the data stored in the page buffer to the host computer 212 sequentially from the first line.

Figure 11A:
FIGS. 11A to 11C are diagrams showing an example of an image represented by notification image data transmitted to the host computer.
Figure 11B:
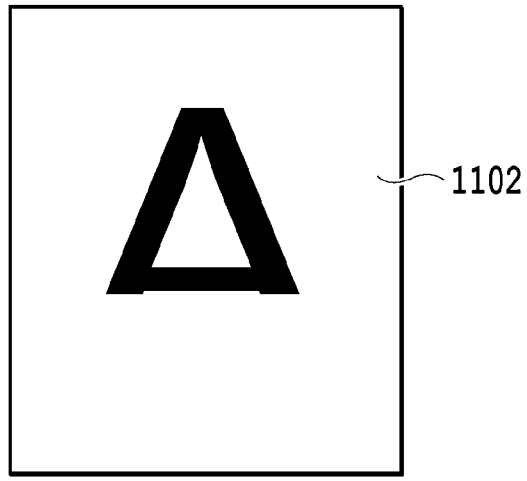
Figure 11C:
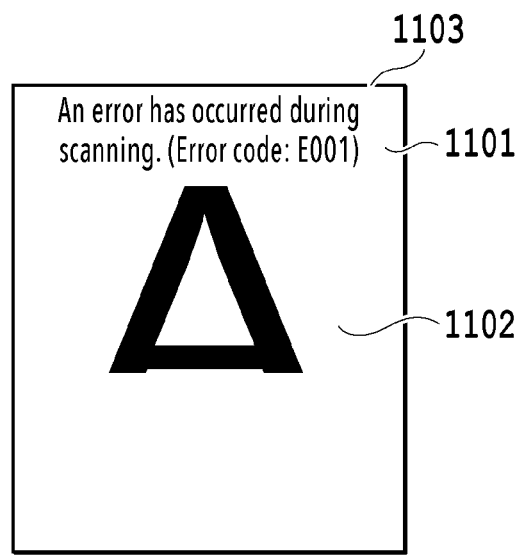

FIGS. 11A to 11C are diagrams showing a concrete example. The notification image data 1101 and successfully-scanned original document image data 1102 are the same as the notification image data 901 and the original document data 902 in FIGS. 9A and 9B. In the present embodiment, in the event of an error occurrence, the notification image data 1101 is first transmitted to the host computer 212, as shown in FIG. 11C. Next, the original document image data 1102 stored in the page buffer is transmitted. As a result, an image shown in FIG. 11C is displayed on the display device 511.

In S1014, the CPU 202 determines whether there is a next scan job. If there is a next scan job, processing proceeds back to S1003 and repeats the processing from S1003 to S1014. Meanwhile, if there is no next scan job, the scan processing is ended.

As thus described, in the present embodiment, in the event of an error occurrence during execution of scanning, notification image data is first transmitted to the host computer, and original document image data is then transmitted to the host computer. In other words, the notification image data is displayed on the display device as an image of the first (top) part of the scanned image. Thus, a user can immediately know that there is an error occurring.

Also, in a case where the host computer performs control to display original document image data on the display device one line at a time, the notification image data is displayed on the top line, which makes it easy for the user to notice the occurrence of an error.

Other Embodiments

Although a standard image scanning apparatus in which an original document 119 is placed on the original document platform 101 is used above as an example of the image scanning apparatus 100, an image scanning apparatus is not limited to this example. Other examples of the image scanning apparatus 100 include an image scanning apparatus with an automatic document feeder (ADF) and a contactless image scanning apparatus. Note that in a case of using an image scanning apparatus with an ADF, image data is transferred such that image data obtained by scanning one line at a time is transferred to the host computer 212.

Although an error due to malfunction of a scanner sensor, an error due to malfunction of a motor, and the like are used above as examples of an error, an error is not limited to these examples. Other examples of an error include an error due to jamming of an original document in an image scanning apparatus with an ADF.

Although the explanation image data 701 and the explanation image data 702 are used above as examples of explanation image data, explanation image data is not limited to these examples. For example, each piece of explanation image data corresponding to each cause of error that can occur in the image scanning apparatus 100 may be stored in the ROM 204.

Although the notification image data 901 and the notification image data 1101 are used above as examples of notification image data, notification image data is not limited to these examples. For example, each piece of notification image data corresponding to each cause of error that can occur in the image scanning apparatus 100 may be stored in the ROM 204.

Although standard driver software originally installed in an operating system is used above as an example of the scanner driver 503, the scanner driver 503 is not limited to this example. As the scanner driver 503, dedicated driver software for a configuration unique to an image scanning apparatus may be used.

Although the original document image 903 and original document image data 1103 are used above as examples of image data for use to convey an error occurrence to a user, image data for use to convey an error occurrence to a user is not limited to these examples. For example, two pieces of notification image data may be displayed on the display device 511 in such a manner as to sandwich scanned original document image data. Conversely, one piece of notification image data may be displayed on the display device 511 in such a manner as to be sandwiched between two pieces of scanned original document image data. Further, original document image data and notification image data may be displayed with a space with the length of a plurality of lines therebetween.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-074087, filed Apr. 26, 2021, which is hereby incorporated by reference wherein in its entirety.

What is claimed is:

1. An image scanning apparatus configured to transmit original document image data by storing, sequentially in a buffer, line data obtained by line-by-line scanning of an original document and transmitting the stored line data to a host computer sequentially line by line, the image scanning apparatus comprising:
   a detection unit configured to detect whether an apparatus status of the image scanning apparatus is normal; and
   a control unit configured to perform control to transmit original document image data including notification image data to the host computer in a case where the detection unit detects that the apparatus status is not normal during processing executed in response to a scan command received from the host computer, the notification image data being a notification of an error occurrence.

2. The image scanning apparatus according to claim 1, wherein
   the image scanning apparatus is configured to transmit line data to the host computer every time the line data is stored in the buffer,
   the control unit stores the notification image data in the buffer at a time point of detecting that the apparatus status of the image scanning apparatus is not normal, and
   the control unit transmits the notification image data stored in the buffer, following the line data which has been transmitted to the host computer up until the time point of detecting that the apparatus status of the image scanning apparatus is not normal.

3. The image scanning apparatus according to claim 1, wherein
   the image scanning apparatus is configured to transmit a plurality of sets of line data stored in the buffer to the host computer sequentially line by line once the processing executed in response to the scan command is completed, and
   the control unit starts the transmission of the line data stored in the buffer after line data forming the notification image data is sequentially transmitted to the host computer.

4. The image scanning apparatus according to claim 1, wherein
   in an event where an error occurrence in a scanner sensor in the image scanning apparatus is detected, the control unit executes the control to transmit the original document image data including the notification image data to the host computer.

5. The image scanning apparatus according to claim 1, wherein
   in an event where an error occurrence in a motor in the image scanning apparatus is detected, the control unit executes the control to transmit the original document image data including the notification image data to the host computer.

6. The image scanning apparatus according to claim 1, wherein in an event where an error occurrence due to insertion of a lock member of the image scanning apparatus into a lock receiving opening is detected, the control unit executes the control to transmit the original document image data including the notification image data to the host computer.

7. The image scanning apparatus according to claim 1, wherein
in an event where an error occurrence due to malfunction of an electric circuit is detected, the control unit executes the control to transmit the original document image data including the notification image data to the host computer.

8. A method for controlling an image scanning apparatus configured to transmit original document image data by storing, sequentially in a buffer, line data obtained by line-by-line scanning of an original document and transmitting the stored line data to a host computer sequentially line by line, the method comprising:
detecting whether an apparatus status of the image scanning apparatus is normal; and
performing control to transmit original document image data including notification image data to the host computer in a case where it is detected that the apparatus status of the image scanning apparatus is not normal during processing executed in response to a scan command received from the host computer, the notification image data being a notification of an error occurrence.

9. The method for controlling the image scanning apparatus according to claim 8, wherein
the image scanning apparatus is configured to transmit line data to the host computer every time the line data is stored in the buffer,
in the controlling, the notification image data is stored in the buffer at a time point of detecting that the apparatus status of the image scanning apparatus is not normal, and
in the controlling, the notification image data stored in the buffer is transmitted following the line data which has been transmitted to the host computer up until the time point of detecting that the apparatus status of the image scanning apparatus is not normal.

10. The method for controlling the image scanning apparatus according to claim 8, wherein
the image scanning apparatus is configured to transmit a plurality of sets of line data stored in the buffer to the host computer sequentially line by line once the processing executed in response to the scan command is completed, and
in the controlling, the transmission of the line data stored in the buffer is started after line data forming the notification image data is sequentially transmitted to the host computer.

11. The method for controlling the image scanning apparatus according to claim 8, wherein
in an event where an error occurrence in a scanner sensor in the image scanning apparatus is detected in the detecting, the control to transmit the original document image data including the notification image data to the host computer is executed in the controlling.

12. The method for controlling the image scanning apparatus according to claim 8, wherein
in an event where an error occurrence in a motor in the image scanning apparatus is detected in the detecting, the control to transmit the original document image data including the notification image data to the host computer is executed in the controlling.

13. The method for controlling the image scanning apparatus according to claim 8, wherein
in an event where an error occurrence due to insertion of a lock member of the image scanning apparatus into a lock receiving opening is detected in the detecting, the control to transmit the original document image data including the notification image data to the host computer is executed in the controlling.

14. The method for controlling the image scanning apparatus according to claim 8, wherein
in an event where an error occurrence due to malfunction of an electric circuit is detected in the detecting, the control to transmit the original document image data including the notification image data to the host computer is executed in the controlling.

15. A non-transitory computer readable storage medium storing a program for causing a computer to perform an image scanning method of transmitting original document image data by storing, sequentially in a buffer, line data obtained by line-by-line scanning of an original document and transmitting the stored line data to a host computer sequentially line by line, the method comprising:
detecting whether an apparatus status of the image scanning apparatus is normal; and
performing control to transmit original document image data including notification image data to the host computer in a case where it is detected that the apparatus status of the image scanning apparatus is not normal during processing executed in response to a scan command received from the host computer, the notification image data being a notification of an error occurrence.

\* \* \* \* \*